United States Patent [19]

Takamatsu

[11] Patent Number: 4,527,210
[45] Date of Patent: Jul. 2, 1985

[54] MODE SELECTING MECHANISM FOR MAGNETIC TAPE RECORDING AND/OR REPRODUCING APPARATUS

[75] Inventor: Ryoji Takamatsu, Yokohama, Japan

[73] Assignee: Sony Corporation, Tokyo, Japan

[21] Appl. No.: 378,896

[22] Filed: May 17, 1982

[30] Foreign Application Priority Data

May 25, 1981 [JP] Japan .................... 56-78860

[51] Int. Cl.³ .................... G11B 15/18; G11B 19/02
[52] U.S. Cl. .................... 360/105; 360/93; 360/137
[58] Field of Search .................... 360/96.3, 96.4, 105, 360/137, 74.1, 74.2, 93, 96.1, 96.2; 242/198–201, 202–204

[56] References Cited

U.S. PATENT DOCUMENTS 4,224,647 9/1980 Umezawa et al. .................... 360/96.3
4,272,792 6/1981 Nakamichi et al. .................... 360/69

*Primary Examiner*—Stuart N. Hecker
*Assistant Examiner*—David J. Severin
*Attorney, Agent, or Firm*—Lewis H. Eslinger; Alvin Sinderbrand

[57] ABSTRACT

A mode selecting mechanism for a magnetic tape recording and/or reproducing apparatus is provided with a rotary member having a crank pin extending therefrom and being mounted on a chassis for turning by a control motor between first and second positions, a head base carrying a magnetic head or heads and being slidably mounted on the chassis for movement between inoperative and operative positions, a first spring acting on the head base for urging the latter toward its operative position and causing engagement of a follower on the head base with the crank pin so that turning of the rotary member is adapted to cause movement of the head base between its inoperative and operative positions, capstans rotatably mounted on the chassis and each having a pinch roller associated therewith and supported by a pivotally mounted lever for movement between inoperative and operative positions relative to the respective capstan, and a connecting linkage engaging the crank pin and each pinch roller supporting lever and including a second spring through which a pinch roller is urged to its operative position against the respective capstan when the rotary member is turned to dispose the head base in its operative position, the directions in which the follower on the head base and the connecting linkage engage the crank pin being selected so that the forces of the first and second springs, respectively, act in opposite rotary directions on the rotary member during the turning of the latter by the control motor.

25 Claims, 7 Drawing Figures

MODE SELECTING MECHANISM FOR MAGNETIC TAPE RECORDING AND/OR REPRODUCING APPARATUS

BACKGROUND OF THE INVENTION

1. Field of the Invention

This invention relates generally to mode selecting mechanism for a magnetic tape recording and/or reproducing apparatus, and more particularly is directed to an improved mode selecting mechanism of the so-called feather-touch push-button type which is especially suitable for magnetic tape recording and/or reproducing apparatus of the reversible type.

2. Description of the Prior Art

In existing magnetic tape recording and/or reproducing apparatus having a mode selecting mechanism of the feather-touch push-button type, each manually depressed or actuated push-button merely operates a respective switching device so that little force needs to be manually exerted, and the motive power for changing-over the mode selecting mechanism between conditions characteristic of respective different modes is provided by a control motor or solenoid. In such existing mode selecting mechanism, there is a relatively large mechanical resistance to the change-over between the conditions characteristic of the different modes, so that the solenoid or control motor provided for exerting the motive power must be capable of applying a correspondingly large force. The use of a solenoid or control motor capable of providing the requisite large force makes it difficult to embody the existing mode selecting mechanism of the feather-touch push-button type in a hand-held or portable magnetic tape recording and/or reproducing apparatus to be driven by a battery or batteries contained therein.

Further, in the case of magnetic tape recording and/or reproducing apparatus of the reversible type, that is, apparatus in which the recording and reproducing of signals on a magnetic tape can be effected during movement of the tape in the normal direction, that is, from the supply reel to the take-up reel, and also during movement of the tape in the reverse direction, that is, from the take-up reel to the supply reel, it is difficult to reduce the size of such apparatus as the latter includes two electric motors, namely, a capstan motor and a reel motor. More particularly, in the existing apparatus of the reversible type, the capstan motor drives a pair of fly wheels through a belt for effecting the "normal-forward" and "reverse-forward" operations, and the reel motor is provided for effecting the "fast-forward" and "rewind" operations by driving the take-up and supply reel shafts. Although an apparatus of the reversible type has been proposed with only a single motor for driving both the capstans and the reel support shafts, such apparatus has required a motor of relatively large power and size. Thus, the previously proposed apparatus of the reversible type is relatively large in size and, furthermore, its mode selecting mechanism for conditioning the apparatus for "normal-forward", "fast-forward" and "rewind" operations is very complex.

OBJECTS AND SUMMARY OF THE INVENTION

Accordingly, it is an object of this invention to provide a mode selecting mechanism for a magnetic tape recording and/or reproducing apparatus which avoids the previously described disadvantages of the prior art.

More specifically, it is an object of this invention to provide a mode selecting mechanism for a magnetic tape recording and/or reproducing apparatus which consumes very little electric power, and thus can be readily operated by a battery power supply.

Another object is to provide a mode selecting mechanism, as aforesaid, which is particularly suited for use in a magnetic tape recording and/or reproducing apparatus of the reversible type.

A further object of the invention is to provide a mode selecting mechanism, as aforesaid, which is relatively simple in construction, and also relatively small-sized and light in weight so as to be suitable for use in a magnetic tape recording and/or reproducing apparatus of the reversible type which is to be hand-held or portable.

In accordance with an aspect of this invention, a mode selecting mechanism for a magnetic tape recording and/or reproducing apparatus comprises rotary means mounted on a chassis for turning between first and second positions by means of a control motor, a head base carrying magnetic head means and being slidably mounted on the chassis for movement between inoperative and operative positions, first spring means acting on the head base for urging the latter to one of said positions thereof, coupling means connected with the head base and being urged against the rotary means by said first spring means acting on the head base so that turning of the rotary means by the control motor is adapted to cause movement of the head base between said inoperative and operative positions, thereof, capstan means rotatably mounted on the chassis, pinch roller support means carrying pinch roller means and being mounted on the chassis for movements between inoperative and operative positions in respect to the capstan means, and connecting means engaging the rotary means and the pinch roller supporting means and including second spring means interposed therebetween and through which the pinch roller means is urged to its operative position against said capstan means with a predetermined pressure therebetween when said rotary means is turned by the control motor for disposing the head base in its operative position, the forces of the first and second spring means, respectively, acting in opposite rotary directions on the rotary means during the turning of the latter by the control motor so that the latter can be of relatively small capacity and hence of correspondingly small size and weight.

In a preferred embodiment of this invention, the rotary means includes a crank pin movable along an arcuate path and being engageable by the follower or coupling means on the head base and also by the connecting means, with the movements of the head base between its inoperative and operative positions being influenced by components of the movements of the crank pin which are parallel to a first direction through the center of turning of the rotary means, and with movements of the pinch roller support means between its inoperative and operative positions being influenced by the components of the movement of the crank pin which are at right angles to said first direction.

Further, in the preferred embodiment of the invention, the capstan means includes forward and reverse drive capstans mounted on the chassis at opposite sides of the head base, the pinch roller support means includes pinch roller support levers pivoted on the chassis and carrying forward and reverse drive pinch rollers, respectively, for movement between inoperative and operative positions in respect to the forward and reverse drive capstans, respectively, the control motor is reversible so as to selectively turn the rotary means in opposite directions from the first or centered position to respective second positions for selecting forward and reverse modes, respectively, and the connecting means selectively urges the pinch roller support leaves carrying the forward and reverse drive pinch rollers to said operative positions thereof in response to the turning of said rotary means to said second positions for selecting forward and reverse modes, respectively.

In accordance with another feature of this invention, a capstan drive motor is carried by a motor base which is mounted on the chassis between the forward and reverse drive capstans for movements between a centered inoperative position and forward and reverse operative positions deflected laterally in opposite directions from the centered inoperative position, means are provided for moving the motor base from its inoperative position to a selected one of its operative positions in response to turning of the rotary means from its first or centered position to a respective one of its second positions, and cooperative transmission means are provided on the capstan drive motor and each of the capstans for engagement upon movement of the motor base to one of its operative positions for driving the respective capstan from the capstan drive motor.

In accordance with still another feature of the invention, take-up and supply reel shafts are rotatably mounted on the chassis at opposite sides of the head base for supporting respective tape reels, first gear means for each of the reel shafts is rotatably coupled with the respective reel shaft, drive gear means are rotatable with each of the capstans, intermediate gear means for each of the reel shafts is mounted on a respective support means so as to be in meshing engagement with the respective drive gear means and movable between inoperative and operative positions in which the intermediate gear means is disengaged and engaged, respectively, with the first gear means associated with the respective one of the reel shafts, and means are provided on the motor base for disposing each of the gear support means in its inoperative position in response to the inoperative position of the motor base and selectively urging the gear support means associated with the take-up and supply reel shafts to the operative positions thereof in response to the movement of the motor base to the forward and reverse operative positions, respectively.

The above, and other objects, features and advantages of this invention, will be apparent in the following detailed description of an illustrative embodiment thereof which is to be read in connection with the accompanying drawings in which the same reference numerals are used to identify the same parts in the various views.

DETAILED DESCRIPTION OF THE PREFERRED EMBODIMENT

Figure 1:
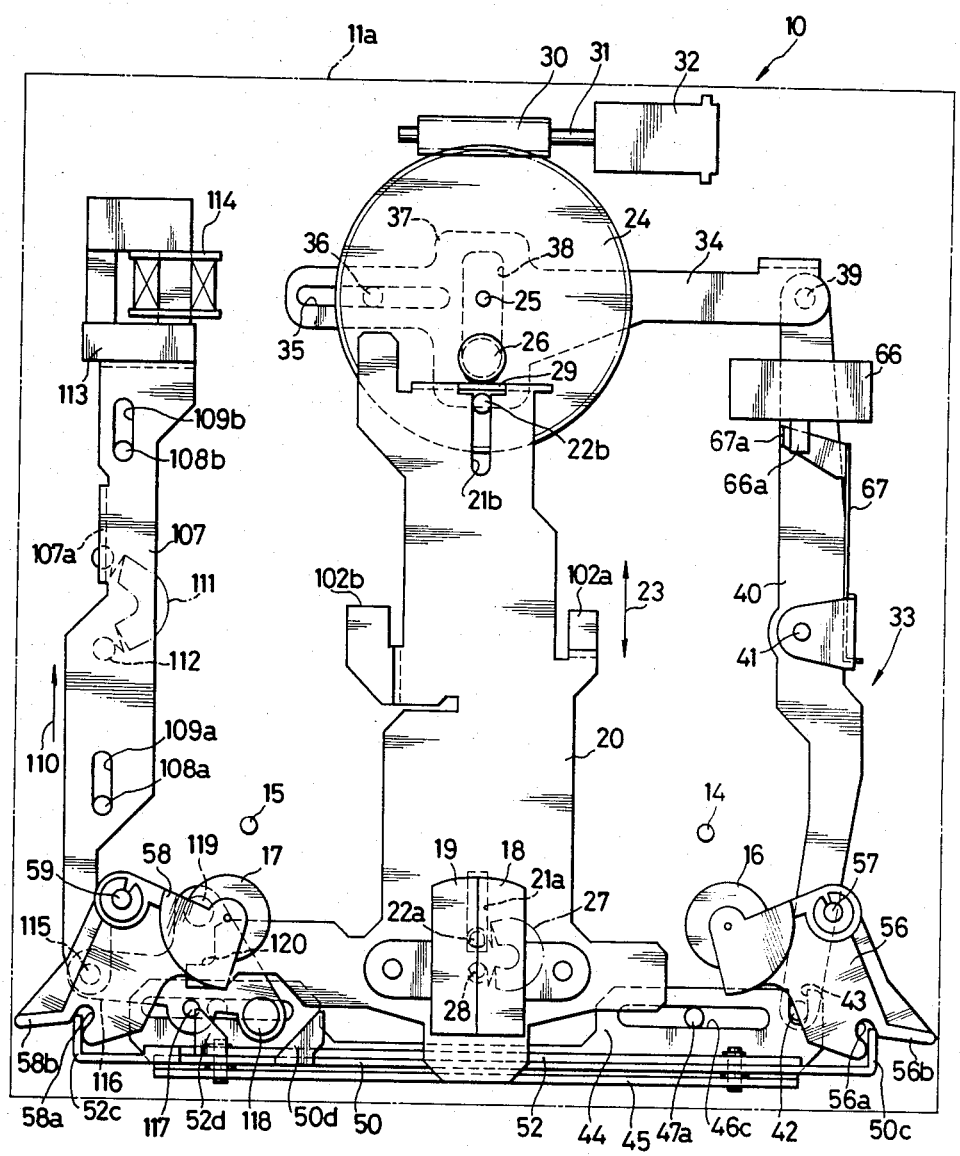
FIG. 1 is a plan view showing elements of a mode selecting mechanism according to an embodiment of this invention shown in its "stop" mode, and which are mounted on an upper member of a chassis shown in dot-dash lines and which is included in a magnetic tape recording and/or reproducing apparatus of the reversible type.
Figure 2:
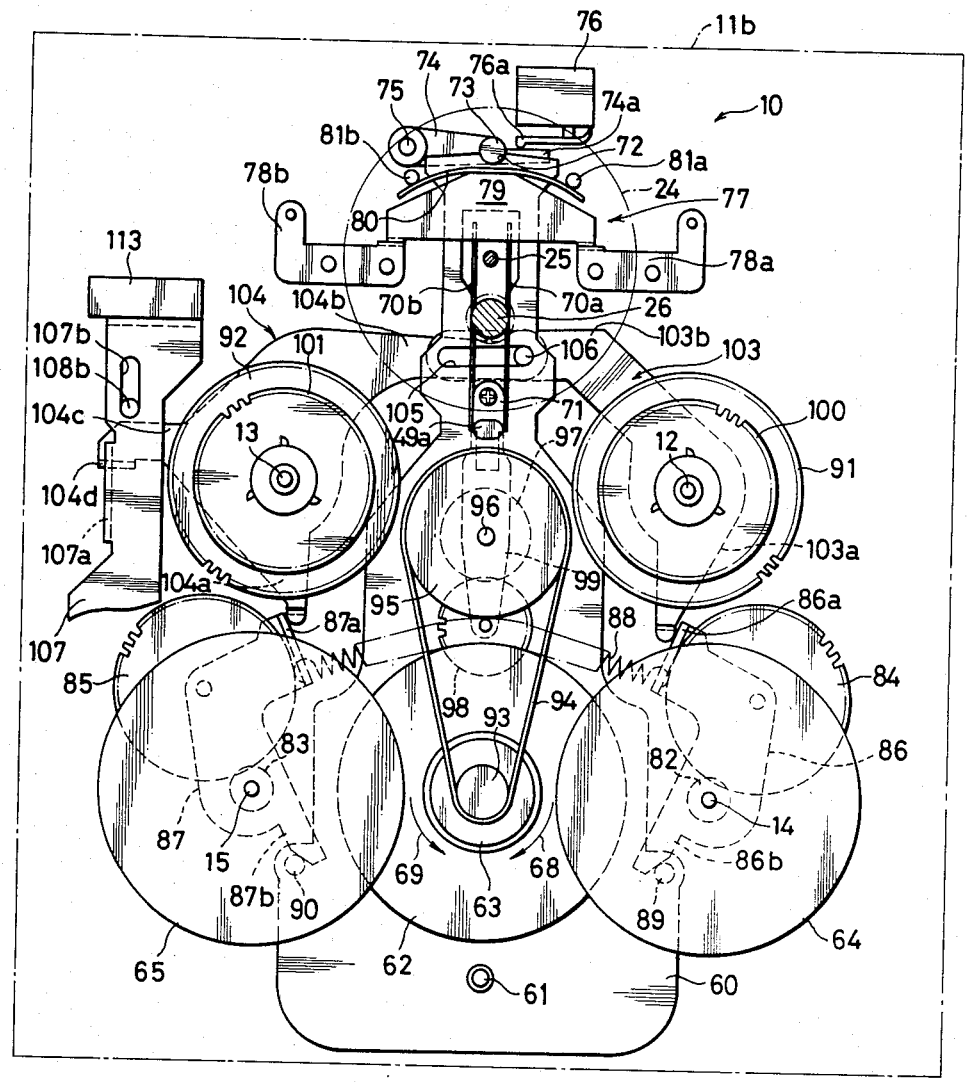
FIG. 2 is a plan view showing other elements of the mode selecting mechanism according to this invention also shown in the "stop" mode, and which are mounted on a lower member of the chassis of the recording and/or reproducing apparatus which is again indicated in dot-dash lines.

Referring to the drawings in detail, and initially to FIGS. 1 and 2, it will be seen that a mode selecting mechanism 10 in accordance with an embodiment of the invention is there shown incorporated in a magnetic tape recording and/or reproducing apparatus of the reversible type having a chassis provided with parallel upper and lower members 11a and 11b, respectively, indicated in dot-dash lines, and which rotatably support laterally spaced apart take-up and supply reel shafts 12 and 13, respectively (FIG. 2), and laterally spaced apart forward and reverse drive capstans 14 and 15, respectively. The take-up and supply reel shafts 12 and 13 and the forward and reverse drive capstans 14 and 15 are located so that, when a standard tape cassette is operatively positioned in the recording and/or reproducing apparatus, shafts 12 and 13 will engage and be rotatably coupled with the take-up and supply reels within the cassette housing, and the capstans 14 and 15 will extend through holes in the cassette housing in back of a run of the magnetic tape which extends along, and is exposed at windows in the front of the cassette housing. Each of the forward and reverse drive pinch rollers 16 and 17 is mounted, as hereinafter described in detail, for selective movement between an inoperative position (FIG. 1) in which the roller 16 or 17 is spaced forwardly from the respective capstan 14 or 15 and an operative position in which the roller 16 or 17 is moved rearwardly through a respective window at the front of the operatively mounted cassette housing to press against the respective capstan 14 or 15 with the tape therebetween. A pair of magnetic recording and/or reproducing heads 18 and 19 for use during the "normal-forward" and "reverse-forward" operations, respectively, are mounted, as hereinafter described in detail, approximately midway between pinch rollers 16 and 17 so as to be movable between an inoperative position (FIG. 1) and an operative position (FIGS. 4 and 5) displaced rearwardly therefrom and in which heads 18 and 19 extend through another of the windows at the front of the cassette housing for engaging the run of the tape extending therealong.

Figure 4:
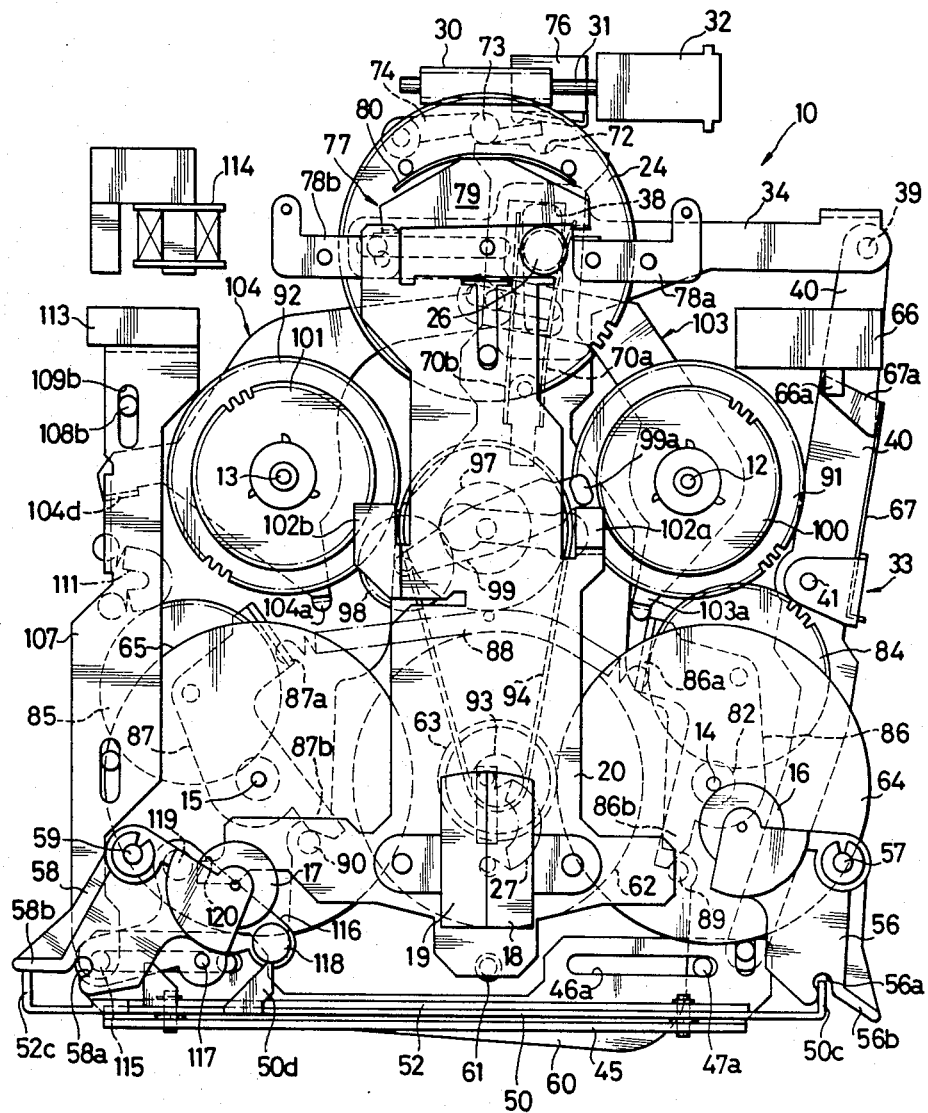
FIG. 4 is a plan view showing the elements appearing on both FIGS. 1 and 2, but with such elements in the positions thereof for selecting the "normal-forward" mode.
Figure 5:
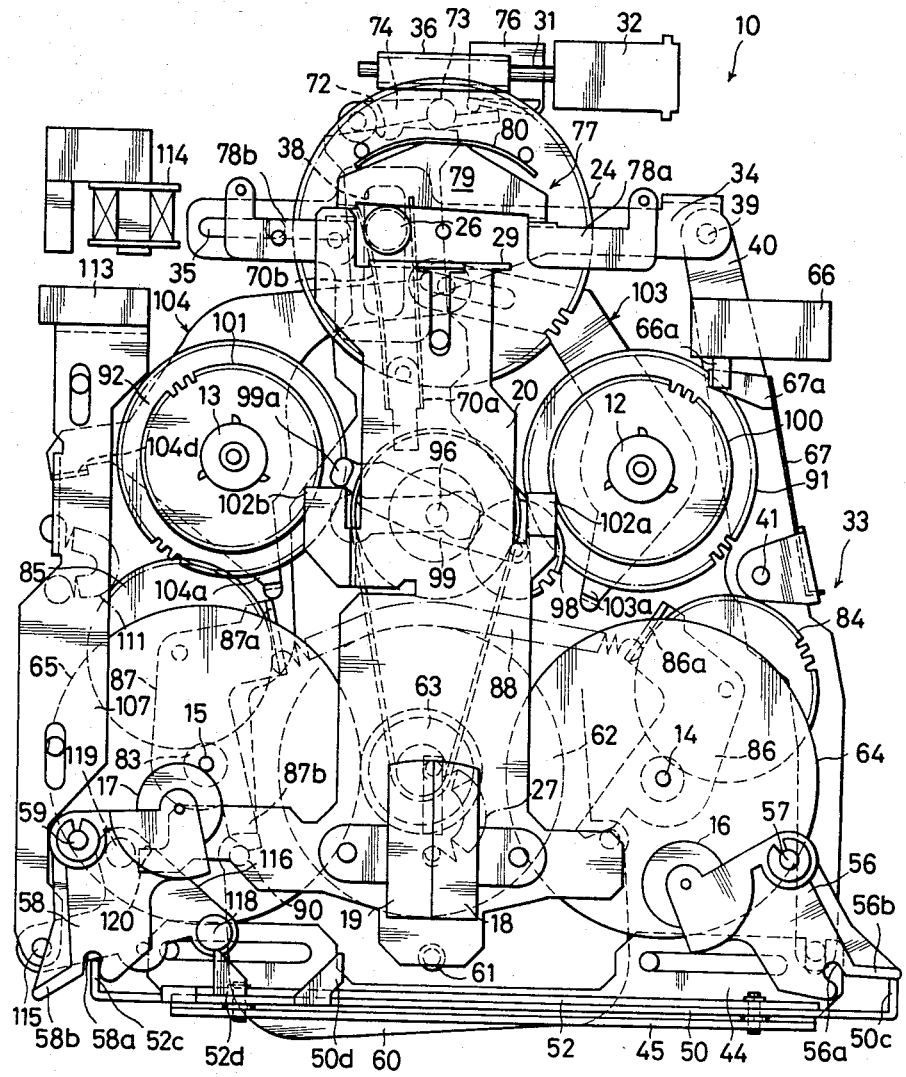
FIG. 5 is a plan view similar to that of FIG. 4, but showing the elements positioned for selecting the "reverse-forward" mode.

In the illustrated embodiment of the invention, heads 18 and 19 are fixedly mounted on the forward end portion of an elongated head base 20 which extends rearwardly between capstans 14 and 15 and is substantially laterally centered in respect to the latter. Head base 20 is formed with longitudinally elongated slots 21a and 21b adjacent the front and back ends thereof, and slidably receiving pins 22a and 22b carried by chassis member 11a and by which head base 20 is mounted for longitudinal reciprocating movement, as indicated by the double-headed arrow 23 on FIG. 1, between an inoperative position (FIG. 1) and an operative position (FIGS. 4 and 5).

In order to effect such movements of head base 20, mechanism 10 is shown to include a rotary member 24 in the form of a worm gear rotatable on an axle 25 carried by chassis member 11a and having a crank pin 26 projecting axially from worm gear 24 at a radial distance from axle 25. A spring 27 is connected, at one end, to guide pin 22a and, at its other end, to an anchor pin 28 secured to head base 20 for urging the latter rearwardly to its operative position corresponding to the operative position of heads 18 and 19, and further for urging a flange 29 at the back end of head base 20 against crank pin 26 so as to constitute a follower or coupling between head base 20 and rotary worm gear 24. A worm 30 is fixed to an output shaft 31 of a small reversible control motor 32 and meshes with worm gear 24 so that worm 30 and worm gear 24 provide an irreversible transmission with a substantial reduction between the rotational speed of motor shaft 31 and the speed at which crank pin 26 is moved in an arcuate path about axle 25. Such arcuate path extends, for example, from a first position (FIG. 1) in which the axis of crank pin 26 is forward of axle 25 in a direction parallel to the direction of the rectilinear movements of head base 20, to one or the other of second positions (FIGS. 4 and 5) in which rotary worm gear 24 has been turned through 90 degrees in the counterclockwise direction and in the clockwise direction, respectively, from the first position (FIG. 1).

Figure 3:
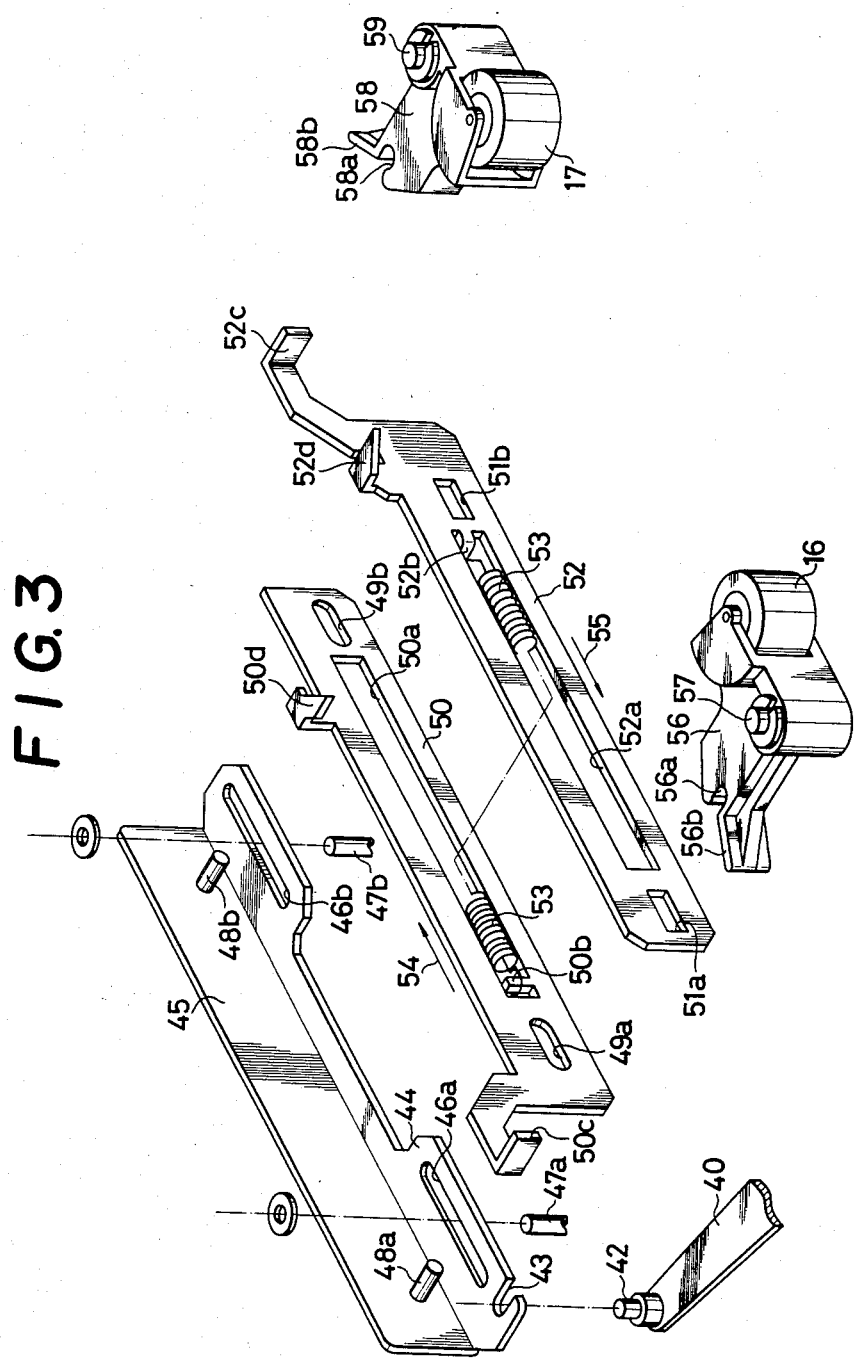
FIG. 3 is an exploded perspective view of a subassembly of the mode selecting mechanism of FIGS. 1 and 2 by which pinch rollers are selectively pressed against respective capstans when a "normal-forward" or "reverse-forward" operation is selected.

In the mode selecting mechanism 10 according to this invention, the positions of pinch rollers 16 and 17 are also selectively controllable in response to the position of crank pin 26 on worm gear 24 as determined by control motor 32. More particularly, a connecting linkage 33 between rotary member or worm gear 24 and the pinch rollers is shown to include a laterally extending, elongated link 34 having a longitudinally extended slot 35 in one end portion to slidably receive a guide pin 36 on chassis member 11a. An intermediate portion 37 of link 34 is transversely enlarged and formed with a transversely elongated slot 38 slidably receiving crank pin 26. The end of link 34 remote from slot 35 is pivotally connected, as by a pin 39, to the back end of a lever 40 which extends along one side of chassis member 11a and is mounted intermediate its ends on a pivot pin 41 carried by chassis member 11a. The opposite or forward end of lever 40 carried an upstanding actuating pin 42 which is engageable in a notch 43 formed in one end portion of a base flange 44 on a laterally extending slide member 45 (FIGS. 1 and 3). As shown particularly on FIG. 3, the opposite end portions of base flange 44 have elongated slots 46a and 46b slidably receiving pins 47a and 47b extending from the forward position of chassis member 11a so as to mount member 45 for lateral sliding movement in response to rocking of lever 40. Pins 48a and 48b are directed rearwardly from the opposite end portions of slide member 45 and are slidably received in slots 49a and 49b, respectively, extending longitudinally in the opposite end portions of an elongated element 50 forming a first pinch roller pressing member. Pins 48a and 48b further are received slidably in slots 51a and 51b extending longitudinally in the opposite end portions of an elongated element 52 which forms a second pinch roller pressing member. It will be appreciated that the engagement of pins 48a and 48b in slots 49a and 51a and in slots 49b and 51b, respectively, mounts elongated pressing members 50 and 52 on slide member 45 while allowing limited longitudinal movements of pressing members 50 and 52 relative to each other and also relative to slide member 45. The central portions of pressing members 50 and 52 are shown to be formed with long slots 50a and 52a, respectively, accommodating a helical tension spring 53 which is secured at one end to an anchor tab or projection 50b formed in one end portion of slot 50a, while the other end of spring 53 is secured to an anchor or tab 52b projecting into slot 52a adjacent the opposite end of the latter. Thus, spring 53 is operative to urge pressing members 50 and 52 in opposite directions indicated by the arrows 54 and 55 on FIG. 3 relative to slide member 45, with such spring-urged movements of elements 50 and 52 being limited by the engagement of pins 48a and 48b with the left-hand ends of the slots 49a and 49b and with the right-hand ends of the slots 51a and 51b, as viewed on FIG. 3. At the end of pressing member 50 extending away from the direction 54 in which such member is urged by spring 53, pressing member 50 is formed with a rearwardly bent finger 50c. Similarly, at the end of pressing member 52 extending away from the direction 55 in which member 52 is urged by spring 53, pressing member 52 is formed with a rearwardly bent or directed finger 52c. Further, projections 50d and 52d extend from the upper edge portions of pressing members 50 and 52, respectively, and are positioned adjacent the ends of pressing members 50 and 52 which are formed with slots 49b and 51b (FIG. 3) so as to be normally disposed adjacent each other with oppositely inclined edges of projections 50d and 52d defining a space therebetween.

The forward drive pinch roller 16 is shown to be rotatably mounted at one end of a support lever 56 which is pivotally mounted, intermediate its ends, on a pivot pin 57 carried by chassis member 11a. The end portion of support lever 56 remote from pinch roller 16 is formed with a notch 56a adapted to receive finger 50c on pressing member 50, as shown on FIG. 1, and being contiguous to a laterally outwardly directed foot 56b on lever 56. Similarly, reverse drive pinch roller 17 is rotatably mounted at one end of a pinch roller support lever 58 which is pivoted intermediate its ends on a pivot pin 59 extending from chassis member 11a, with the end portion of lever 58 remote from pinch roller 17 having a notch 58a opening to receive finger 52c on pressing member 52 and being contiguous to a foot 58b extending laterally outward from notch 58a.

It will be appreciated that, when lever 40 is rocked to the position shown on FIG. 4, slide member 45 is displaced toward the left as viewed on FIG. 4, that is, in the direction of the arrow 54 on FIG. 3. Since pins 48a and 48b already engage the ends of slots 51a and 51b in the direction of movement of slide member 45, pressing member 52 is directly coupled with slide member 45 and its finger 52c is moved out of notch 58a and slides along foot 58b for stabilizing pinch roller 17 and its support lever 58 in their inoperative positions relative to reverse drive capstan 15. On the other hand, pressing member 50 is yieldably urged by spring 53 to follow the movement of slide member 45 in the direction of arrow 54. In the course of such movement of pressing member 50, its finger 50c engages in notch 56a of lever 56 to pivot the latter to the operative position shown on FIG. 4 and in which pinch roller 16 is yieldably urged against forward drive capstan 14 with a contact force determined by spring 53.

On the other hand, when lever 40 is rocked to the position shown on FIG. 5, pressing member 50 moves, as a unit, with slide member 45 and its finger 50c disengages from notch 56a and slides along foot 56b of lever 56 to stabilize the latter and pinch roller 16 thereon in their inoperative positions relative to forward drive capstan 14. Simultaneously, pressing member 52 is drawn along with slide member 45 through spring 53 so that finger 52c remains engaged in notch 58a and urges lever 58 and pinch roller 17 to their operative positions at which roller 17 is pressed against reverse drive capstan with a force determined by spring 53.

As shown on FIG. 2, an elongated motor base 60 is pivotally mounted, at its forward end, on a pivot pin 61 carried by lower chassis member 11b and extends rearwardly from pivot pin 61 between capstans 14 and 15 and between reel support shafts 12 and 13. A reversible capstan drive motor 62 is mounted on motor base 60 rearwardly of pivot pin 61 so as to be disposed between capstans 14 and 15, and a drive wheel 63 which desirably has a rubber tire on its periphery, is secured on the shaft of motor 62. Fly wheels 64 and 65 are secured in respect to capstans 14 and 15 so as to be at the level of drive wheel 63, and such fly wheels 64 and 65 are diammetrically dimensioned so that, with motor base 60 in its central or neutral position shown on FIG. 2, the rubber tired periphery of drive wheel 63 is spaced from the peripheries of both fly wheels 64 and 65. However, when motor base 60 is angularly displaced about its pivot 61 from its central position toward the right, for example, to the position shown on FIG. 4, the periphery of drive wheel 63 engages the periphery of fly wheel 64 for driving capstan 14. On the other hand, when motor base 60 is angularly displaced from its central position toward the left, for example, to the position shown on FIG. 5, drive wheel 63 engages the periphery of fly wheel 65 for driving capstan 15.

The directions of rotation of reversible capstan drive motor 62 for the "normal-forward" and "reverse-forward" modes, respectively, are determined by a switch device 66 (FIG. 1) mounted on chassis member 11a adjacent lever 40 and having an actuating element 66a which is engageable by a bent end portion 67a of a leaf spring 67 secured to lever 40. When lever 40 is rocked from its neutral position shown on FIG. 1 to the position shown on FIG. 4 so as to cause pinch roller 16 to press against capstan 14, as earlier described, spring 67 causes switch device 66 to condition the control circuit of motor 62 for driving the latter in the forward direction, that is, for rotating drive wheel 63 in the clockwise direction, as indicated by the arrow 68 on FIG. 2, whereby to rotate capstan 14 in the counterclockwise direction by the engagement of drive wheel 63 with fly wheel 64. On the other hand, when lever 40 is pivotally moved in the opposite direction, for example, to the position shown on FIG. 5 so as to cause pinch roller 17 to press against capstan 15, leaf spring 67 causes changeover of switch device 66 so that motor 62 is driven in the reverse direction, thereby to rotate drive wheel 63 in the counterclockwise direction, as indicated by the arrow 69 on FIG. 2, for causing rotation of capstan 15 in the clockwise direction by the engagement of drive wheel 63 with fly wheel 65.

In order to effect the pivotal movements of motor base 60 to either side from the central position of FIG. 2, leaf springs 70a and 70b are secured, at one end, to a mounting member 71 attached to the rear end portion of motor base 60 and extend in parallel, spaced apart relation rearwardly from mounting member 71 so as to embrace crank pin 26. Thus, when rotary worm gear 24 is in its first position shown on FIG. 2, the engagement of crank pin 26 between leaf springs 70a and 70b maintains motor base 60 in its central position. However, when worm gear 24 is turned through 90 degrees in either the counterclockwise direction to the position shown on FIG. 4 or in the clockwise direction to the position shown on FIG. 5, motor base 60 is pivoted about pin 61 to engage drive wheel 63 with fly wheel 64 or fly wheel 65, respectively. In each case, the contact force of wheel 63 against fly wheel 64 or 65 is determined by the leaf spring 70a or 70b.

The back end surface of motor base 60 is shown to be formed with a centrally located, semi-circular recess 72 engageable by a circular projection 73 provided on a switch operating lever 74 which is pivoted, as at 75, on chassis member 11b (FIG. 2). An extension 74a of lever 74 is engageable with an actuating member 76a of a microswitch 76 which, as hereinafter described, serves to detect the central or neutral position of motor base 60 and the corresponding first position of rotary worm gear 24 and is included in a switching arrangement for controlling the turning of worm gear 24 by control motor 32. More particularly, microswitch 76 is open so long as projection 73 on lever 74 engages in recess 72, that is, when motor base 60 is in its neutral or central position and rotary worm gear 24 is in its first position. However, when worm gear 24 is turned in either direction from that first position so as to angularly displace motor base 60 from its central position, projection 73 on lever 74 moves out of recess 72 with the result that extension 74a of lever 74 acts against switch actuator 76a so as to close microswitch 76.

The switching arrangement for controlling the operation of control motor 32 further includes a switch assembly 77 which detects when rotary worm gear 24 has been turned through 90 degrees in either direction from its first position (FIG. 2) to the respective second positions (FIGS. 4 and 5). More particularly, switch assembly 77 is shown to include a pair of laterally spaced apart fixed contacts 78a and 78b suitably mounted in respect to chassis member 11b at opposite sides of the axle 25 on which worm gear 24 is rotatable, and a movable switch plate 79 of electrically conductive material which spans the spaced between fixed contacts 78a and 78b. A resilient strip 80 is joined, at its middle, to switch plate 79 and is engageable, at its opposite end portions, against abutments 81a and 81b fixed to chassis member 11b. Such abutments 81a and 81b are located so that resilient strip 80 is arcuately flexed thereby, as shown on FIG. 2, for yieldably urging the end portions of switch plate 79 against fixed contact 78a and 78b, whereby to provide a conductive path therebetween for closing switch assembly 77. However, when rotary worm gear 24 is turned through 90 degrees to one or the other of its second positions (FIGS. 4 and 5), crank pin 26 acts rearwardly against the forward edge of switch plate 79 to angularly displace or tilt the latter against the force of resilient strip 80 and thereby separate one or the other of the end portions of switch plate 79 trom the respective fixed contact 78a (FIG. 4) or 78b (FIG. 5), for opening switch assembly 77.

For the purpose of effecting selective rotation of take-up and supply reel shafts 12 and 13, drive gears or pinions 82 and 83 are integral with fly wheels 64 and 65 so as to be rotatable with capstans 14 and 15, respectively. Drive gears 82 and 83 mesh continuously with intermediate gears 84 and 85, respectively, which are freely rotatable on gear support levers 86 and 87, respectively, mounted for pivoting about the axes of capstans 14 and 15. Gear support levers 86 and 87 have flanged end portions 86a and 87a between which there is connected a helical tension spring 88 for urging levers 86 and 87 in the counterclockwise clockwise directions, respectively, about capstans 14 and 15. The opposite end portions of levers 86 and 87 have projecting arms 86b and 87b, respectively, which are engageable by pins 89 and 90 extending from opposite side portions of motor base 60 for holding levers 86 and 87 against turning in the directions they are urged by spring 88 when motor base 60 is in its central or neutral position. However, when motor base 60 is pivoted about pin 61 from its neutral or central position, for example, to the position shown on FIG. 4, pin 89 is moved away from arm 86b on lever 86 to permit spring 88 to pivot lever 86 in the counterclockwise direction about the axis of capstan 14 and thereby engage intermediate gear 84 with a gear 91 which is rotatably coupled with take-up reel shaft 12. Similarly, when motor base 60 is pivoted in the opposite direction from its central position to the position shown on FIG. 5, pin 90 is moved away from arm 87b on lever 87 to permit spring 88 to urge lever 87 in the clockwise direction about the axis of capstan 15 and thereby move intermediate gear 85 into meshing engagement with a gear 92 rotatably coupled with supply reel shaft 13. The driving of take-up reel shaft 12 from capstan 14 by way of pinion 82 and gears 84 and 91, or the driving of supply reel support shaft 13 from capstan 15 by way of pinion 83 and gears 85 and 92 serves to rotate the reel shaft 12 or 13 at the relatively slow speed required for the normal-forward or reverse-forward mode of the recording and/or reproducing apparatus.

For driving the reel shaft 12 or 13 at a high rotational speed, as during operation in the fast-forward or rewind mode, respectively, of the apparatus, a pulley 93 is fixed to the output shaft of motor 62 for rotation with drive wheel 63 and drives a belt 94 which runs around a pulley 95 rotatable on a shaft 96 extending from chassis member 11b midway between reel shafts 12 and 13. A gear 97 is integral with pulley 95 for rotation with the latter and meshes wtih a gear 98 rotatably mounted at one end of a lever 99 which is pivoted, intermediate its ends, on shaft 96. The end portion of lever 99 remote from gear 98 is angled to form an abutment 99a by which turning of lever 99 about shaft 96 may be limited, as hereinafter described in detail. Further, an end face of gear 97 frictionally contacts lever 99 so that the latter is frictionally urged to turn about shaft 96 in the same direction as gear 97 when the latter is rotated in one direction or the other with pulley 95 by the operation of reversible capstan drive motor 62. If the turning of lever 99 about shaft 96 is not limited by engagement with abutment 99a, operation of capstan drive motor 62 for rotating its shaft and pulley 93 in the counterclockwise direction causes turning of lever 99 in that same direction until gear 98 comes into meshing engagement with a gear 100 coupled with take-up reel shaft 12 so that the latter is rotated at high speed, for example, as during an operation of the apparatus in its fast-forward mode. On the other hand, if reversible motor 62 is operated for driving its shaft and pulley 93 in the clockwise direction, lever 99 is turned in the same direction until gear 98 thereon comes into meshing engagement with a gear 101 rotatably coupled with supply reel shaft 13. In the latter case, shaft 13 is rotated at a relatively high speed, as during operation of the apparatus in its rewind mode.

In order to ensure that gear 98 does not come into engagement with gear 100 or gear 101 during operation of the apparatus in its normal-forward mode or reverse-forward mode, head base 20 is formed with projecting stops 102a and 102b extending from the opposite sides thereof approximately midway between the ends of head base 20 (FIG. 1). Such stops 102a and 102b are positioned at a level to be engageable selectively by abutment 99a on lever 99. When head base 20 is in its operative position, the engagement of abutment 99a with stop 102a (FIG. 4) or with stop 102b (FIG. 5) occurs at a turned position of lever 99 in which gear 98 is held out of engagement with gear 101 or with gear 100, respectively. Thus, when head base 20 is in its operative position, take-up reel shaft 12 can only be driven by motor 62 through drive wheel 63 fly wheel 64 and gears 82, 84 and 91, as in the normal-forward mode of the apparatus, and supply reel shaft 13 can be driven by motor 62 only through drive wheel 63, fly wheel 64 and gears 83, 85 and 92.

For further determining when intermediate gears 84 and 85 may selectively engage gears 91 and 92, respectively, mode selecting mechanism 10 is shown to include locking levers 103 and 104 which are pivotally mounted, intermediate their ends, for turning about take-up reel shaft 12 and supply reel shaft 13, respectively. These locking levers 103 and 104 have forwardly directed arms 103a and 104a, respectively, which, in the active positions of lever 103 and 104 shown on FIG. 2, extend into the paths of end flanges 86a and 87a on gear support levers 86 and 87, respectively, so that, even if the pin 89 or 90 is moved away from the projecting arm 86b or 87b, respectively, spring 88 cannot pivot lever 86 or 87 for engaging its supported intermediate gear 84 or 85 with the gear 91 or 92, respectively. In order to be movable jointly about the axes of shafts 12 and 13, locking levers 103 and 104 have arms 103b and 104b directed laterally toward each other at the end portions of the levers remote from arms 103a and 104a, and arm 103b has a slot 105 extending longitudinally therein and slidably receiving a pin 106 directed upwardly from the end of arm 104b. Locking lever 104 further has a laterally outwardly directed arm 104c extending therefrom and terminating in a forwardly facing flange 104d. For controlling locking levers 103 and 104, an elongated slide member 107 extends along the side portion of chassis member 11a remote from lever 40 and is mounted for longitudinal sliding movement by means of pins 108a and 108b extending from chassis member 11a and slidable in slots 109a and 109b extending longitudinally in the front and back portions of slide member 107. Slide member 107 is yieldably urged in the rearward direction, as indicated by the arrow 110 on FIG. 1, by means of a spring 111 connected between an anchor 112 on chassis member 11a and a flange 107a formed along a portion of one side of slide member 107. Such flange 107a is formed with a notch (not shown) to receive the flange 104d on locking lever 104, whereby locking levers 103 and 104 are controlled, in their pivotal movements about shafts 12 and 13, by longitudinal positioning of slide member 107. An armature 113 of iron or the like is fixed to the back end of slide member 107 so as to be urged against an electromagnet 114 carried by chassis member 11a when slide member 107 is rearwardly displaced by spring 111. The forward end of slide member 107 is pivotally connected, as at 115, to one end of an operation controlling lever 116 which is pivotally mounted, intermediate its ends, on a fixed pivot pin 117 extending from chassis member 11a. A cylindrical abutment pin 118 extends from the end of lever 116 remote from its connection 115 to slide member 107 and, in the stop mode of the apparatus (FIG. 1), extends into the space defined between the oppositely inclined edges of projections 50d and 52d. Also provided on operation controlling lever 116 is a blocking pin 119 which, when slide member 107 is in its rearmost position disposing armature 113 against electromagnet 114, is positioned directly in back of a laterally extending step 120 on head base 20 for limiting the rearward movement of head base 20 short of its operative position, as shown on FIG. 7.

The force of spring 53 which resists movement of each of pressing members 50 and 52 relative to slide member 45 is made greater than the force of spring 111 urging slide member 107 rearwardly. Therefore, so long as solenoid or electromagnet 114 is deenergized and armature 113 on slide member 107 is held against electromagnet 114 only by the action of spring member 111, the lateral movement of slide member 45 and of pressing members 50 and 52 therewith in one direction or the other causes the inclined edge of projection 50d or 52d to act against abutment pin 118 for pivoting the latter in the counterclockwise direction about pivot pin 117, for example, to the position shown on FIG. 4 or 5, whereby blocking pin 119 is displaced laterally outward from the path of travel of stop 120 to avoid interference with the rearward movement of head base 20 to its operative position. Further, pivoting of lever 116 to the position shown on FIG. 4 or 5, and the consequent forward displacement of slide member 107, is effective, due to the engagement of flange 104d of locking lever 104 in a cutout of flange 107a on slide member 107, to turn locking lever 104 in the counterclockwise direction and, due to the engagement of pin 106 in slot 105, to turn locking lever 103 in the clockwise direction. Thus, locking levers 103 and 104 are turned from the positions shown on FIG. 2, for example, to the positions shown on FIGS. 4 and 5 in which arms 103a and 104a of the locking levers no longer interfere with the movements of levers 86 and 87 necessary for the selective engagement of gears 84 and 91 or of gears 85 and 92 under the urging of spring 88.

DESCRIPTION OF OPERATION

Starting with the various elements of the above-described mode selecting mechanism 10 according to this invention in the positions thereof shown on FIGS. 1 and 2 for establishing the "stop" mode, the operation or changeover of such mechanism 10 for establishing the "normal-forward" mode will now be described with reference to FIG. 4. In response to manual depressing of a "normal-forward" push-button (not shown), reversible control motor 32 is operated in the forward direction, that is, in the direction for turning worm gear 24 counterclockwise from its first position shown on FIGS. 1 and 2. The corresponding movement of crank pin 26 engaged by flange 29 on head base 20 permits spring 27 to move head base 20 rearwardly toward its operative position (FIG. 4). Upon initiation of the movement of crank pin 26 from its position shown on FIGS. 1 and 2, motor base 60 is pivoted thereby so that projection 73 of lever 74 moves out of recess 72 to cause closing of microswitch 76 so that operation of control motor 32 continues through closed microswitch 76 and switch assembly 77. When crank pin 26 attains the position shown in FIG. 4, switch plate 79 is tilted thereby so as to be separated from fixed contact 78a and thereby open switch assembly 77 for halting further operation of control motor 32 with head plate 20 maintained in its corresponding operative position. As a result of movement of head base 20 to its operative position, heads 18 and 19 thereon are brought into contact with the magnetic tape in the housing of a cassette (not shown) operatively positioned on the recording and/or reproducing apparatus.

The depressing of the "normal-forward" push-button is further conventionally effective to energize capstan drive motor 62 for operation in the forward direction, that is, for causing drive wheel 63 to rotate in the clockwise direction, as viewed on FIG. 4. The movement of crank pin 26 to the position shown on FIG. 4 is also effective, by way of leaf springs 70a and 70b, to urge motor base 60 to pivot toward the right about pin 61 sufficiently to press drive wheel 63 against the periphery of fly wheel 64 for rotation capstan 14 at a constant speed. The pivoting of motor base 60 to the position shown on FIG. 4 is also effective to release pin 89 from arm 86b of lever 86 and thereby permit spring 88 to pivot lever 86 in the counterclockwise direction about the axis of capstan 14 for engaging intermediate gear 84 with gear 91. Thus, the rotation of capstan 14 is transmitted through gears 82, 84 and 91 to take-up reel shaft 12 for rotating the latter in the counterclockwise direction, as viewed on FIG. 4, and thereby winding tape on the take-up reel of the operatively positioned cassette.

It will be seen that, when head base 20 moves to its operative position (FIG. 4) for selection of the "normal-forward" mode, projecting stop 102a is moved rearwardly to be engageable by abutment 99a on lever 99 for limiting the turning of the latter to the illustrated position in which gear 98 is held out of engagement with gear 101 coupled to supply reel shaft 13. Thus, although gear 98 is rotated by motor 62 in the "normal-forward" mode through the transmission constituted by pulley 93, belt 94, pulley 95 and gear 97, and lever 99 is turned by the frictional engagement of gear 97 with lever 99, the limitation of such turning prevents engagement of gear 98 with gear 101. Thus, in the "normal-forward" mode, only take-up reel shaft 12 is rotated.

The movement of crank pin 26 to the position shown on FIG. 4 is effective, by reason of its slidable engagement in slot 38 of link 34 to displace the latter in its longitudinal direction and thereby pivot lever 40 to the position shown on FIG. 4 in which leaf spring 67 actuates switch device 66 to establish the desired direction of rotation of motor 62 for the "normal-forward" mode. The pivoting of lever 40 to the position shown on FIG. 4 further causes displacement of slide member 45 toward the left, and during such displacement, pressing member 52 is directly coupled with slide member 45 and finger 52c of pressing member 52 is moved out of notch 58a of pinch roller support lever 58 and slides along foot 58b thereof for stabilizing pinch roller 17 in its inoperative position spaced from capstan 15. On the other hand, pressing member 50 is yieldably urged, by spring 53 to follow the movement of slide member 45 with finger 50c on pressing member 50 engaging in notch 56a of lever 56 to pivot the latter to its operative position in which pinch roller 16 is yieldably urged against capstan 14 with a contact force determined by spring 53. In the course of such movement of pressing member 50 with slide member 45, the angled or inclined edge of projection 50d acts against abutment pin 118 to pivot operation controlling lever 116 to the position shown on FIG. 4, and in which blocking pin 119 on lever 116 is drawn laterally out of the path of step 120 on head base 20 so as to avoid interference with the rearward movement of the latter to is operative position.

The above mentioned pivoting of operation controlling lever 116 is further effective to displace slide member 107 forwardly to the position shown on FIG. 4 against the force of spring 111, it being understood that electromagnet 114 is not energized when the push-button for selecting the "normal-forward" mode is depressed. The forward movement of slide member 107 to the position shown on FIG. 4 causes pivoting of locking levers 103 and 104 to the positions shown on FIG. 4, and in which the arms 103a and 104a thereof are moved laterally towards each other so as to avoid interference of arm 103a with the pivoting of gear support lever 86 to the position necessary for engaging gear 84 carried thereby with gear 91.

It will be appreciated from the above that, in the mode selecting mechanism 10 according to this invention, the pivoting of motor base 60 is effective to establish both the driving of capstan 14 from capstan drive motor 62 and the driving of take-up reel shaft 12 from capstan 14. Such pivoting of motor base 60 results simply from the turning of crank pin 26 with worm gear 24 through 90 degrees, which turning of crank pin 26 is further effective to control the movement of head base 20 to its operative position by spring 27, and also to effect the pressing of pinch roller 16 against capstan 14 with a contact pressure determined by spring 53.

It will also be appreciated that, when the various elements of mechanism 10 are in the positions shown on FIG. 4 with a tape cassette operatively positioned in the recording and/or reproducing apparatus, pinch roller 16 extends through a window at the front of the cassette housing to press the tape against rotated capstan 14 so that the latter drives the tape in the forward direction at a constant speed past heads 18 and 19 also extending into the cassette housing. The tape which is thus driven is unwound from the supply reel engaged with reel shaft 13, and is wound on the takeup reel engaged with reel shaft 12 which is being suitably rotated. As earlier noted, the contact pressure of pinch roller 16 against capstan 14 is determined by spring 53, in other words, pinch roller 16 is brought against capstan 14 with a tape therebetween prior to the arrival of crank pin 26 and slide member 45 at the positions shown on FIG. 4 and, during the final increment of turning of crank pin 26 with worm gear 24 from the position of FIGS. 1 and 2 to the position of FIG. 4, spring 53 is flexed by the final increment of movement of slide member 45 to generate the force urging pinch roller 16 against capstan 14. Therefore, such spring force of spring 53 reacts through the engagement of pin 42 of lever 40 in notch 43 of slide member 45, and through the engagement of crank pin 26 in slot 38 of link 34 which is connected to lever 40, to resist the final increment of turning of crank pin 26 to the position of FIG. 4. However, at least part of this load or spring force of spring 53 resisting the final turning of crank pin 26 in the counterclockwise direction is cancelled or overcome by the action of flange 29 of spring-urged head base 20 against crank pin 26. More particularly, as crank pin 26 nears the position shown on FIG. 4, the force of spring 27 which acts rearwardly on head base 20 and is transmitted by flange 29 to crank pin 26, acts increasingly to urge crank pin 26 to turn in the counterclockwise direction, that is, to at least partly cancel or overcome the described resistance to such turning of crank pin 26 by spring 53. By reason of the foregoing, the driving force needed to turn worm gear 24 does not need to be large with the result that control motor 32 can be relatively compact. Furthermore, the reduction ratio provided by worm 30 and worm gear 24 does not need to be excessively great so that the turning of worm gear 24 from its first position of FIGS. 1 and 2 to its second position of FIG. 4 for establishing the "normal-forward" mode can be quickly effected by motor 32.

When it is desired to terminate operation of the recording and/or reproducing apparatus in its "normal-forward" mode, a push-button (not shown) for establishing the "stop mode" may be depressed to initiate operation of control motor 32 in the reverse direction, that is, for turning worm gear 24 and crank pin 26 in the clockwise direction from the position of FIG. 4 back to the position of FIGS. 1 and 2. After initiation of such turning of worm gear 24 by manual depressing of the respective push-button, crank pin 26 moves away from switch plate 79 so that the latter again engages fixed contact 78a for closing switching assembly 77, whereupon the operation of control motor 32 continues through closed switch assembly 77 and closed microswitch 76. However, when crank pin 26 is returned to its first position (FIGS. 1 and 2), thereby restoring motor base 60 to its centered or neutral position, such centered position is detected by engagement of projection 73 on switch operating lever 74 in recess 72 to permit switch actuating member 76a to open microswitch 76 and thereby halt operation of control motor 32. In returning from the position of FIG. 4 to the positions of FIGS. 1 and 2, crank pin 26 acts forwardly on flange 29 of head base 20 to return the latter to its inoperative position against the force of spring 27. Such return movement of crank pin 26 further restores link 34 to the position shown on FIG. 1, whereby pinch roller 16 is separated from capstan 14. The return of motor base 60 to its central or neutral position shown on FIG. 2 separates drive wheel 63 from fly wheel 64, thereby to halt the rotation of capstan 14, and brings pin 89 against arm 86b of gear support lever 86 to pivot the latter in the clockwise direction against the force of spring 88 and thereby separate gear 84 from gear 91, so as to interrupt the driving of take-up reel shaft 12. Thus, the various parts of mechanism 10 are restored to their original positions corresponding to the "stop" mode of the apparatus.

When it is desired to establish the "reverse-forward" mode of operation, a push-button (not shown) for selecting that mode is manually depressed to initiate operation of control motor 32 in the reverse direction and thereby cause turning of worm gear 24 and crank pin 26 thereon in the clockwise direction through about 90 degrees from the first position of FIGS. 1 and 2 to the second position of FIG. 5. Such turning of crank pin 26 permits spring 27 to again displace head base 20 in the rearward direction to its operative position in which heads 18 and 19 enter an operatively positioned tape cassette for slidably contacting the tape within the housing thereof. Further, crank pin 26 causes motor base 60 to pivot about pin 61 toward the left, as viewed on FIG. 5, so that drive wheel 63 engages the periphery of fly wheel 65 and pin 90 moves away from arm 87b of lever 87 to permit spring 88 to pivot such lever 87 in the clockwise direction about the axis of capstan 15 for engaging gear 85 with gear 92.

In response to the clockwise turning of worm gear 24 and crank pin 26 to the position of FIG. 5, link 24 is moved toward the left to pivot lever 40 in the counterclockwise direction about pin 41. Such counterclockwise pivoting of lever 40 causes spring 67 to actuate switch device 66 so as to cause operation of motor 62 in the reverse direction, thereby to effect counterclockwise rotation of drive wheel 63 which, by its engagement with fly wheel 65, causes clockwise rotation of capstan 15 which is, in turn, transmitted through gears 83, 85 and 92 to cause clockwise rotation of supply reel shaft 13.

The pivoting of lever 40 to the position shown on FIG. 5 causes linear displacement of slide member 45 toward the right, as there viewed, to directly drive pressing member 50 in the same direction, whereby finger 50c is removed from notch 56a and engages shoe 56b for stabilizing lever 56 in its inoperative position in which pinch roller 16 is held away from capstan 14. The displacement of slide member 45 toward the right on FIG. 5 is transmitted to pressing member 52 by way of spring 53 so that the engagement of finger 52c in notch 58a of lever 58 urges the latter in the counterclockwise direction about its pivot pin 59 for pressing pinch roller 17 against capstan 15 with a force determined by spring 53.

Once again, electromagnet 114 is not energized so that, as pressing member 52 is urged toward the right by spring 53 to follow the similar movement of slide member 45, the inclined edge of projection 52d can act on pin 118 to pivot operation controlling lever 116 to the position shown on FIG. 5, and in which blocking pin 119 is laterally displaced from the path of step 120 to avoid interference with the movement of head base 20 to its operative position. Further, the pivoting of operation controlling lever 116 by projection 52d moves slide member 107 forwardly against the force of spring 111 to the position shown on FIG. 5 and in which locking levers 103 and 104 are pivoted about the axis of shafts 12 and 13, respectively, for displacing arms 103a and 104a thereof laterally toward each other and out of the paths of end flanges 86a and 87a on gear supporting levers 86 and 87. In the "reverse-forward" mode, the rearward movement of head base 20 to its operative position disposes stop 102b so as to be engageable by abutment 99a on lever 99 for limiting the turning of the latter to a position in which gear 98 is still spaced from gear 100 associated with take-up reel shaft 12.

After the change-over to the "reverse-forward" mode has been initiated by manual depression of the respective push-button, microswitch 76 is closed in response to the movement of recess 72 away from projection 73 of switch operating lever 74 so that control motor 32 continues to be operated in the required direction through closed microswitch 76 and normally closed switch assembly 77. However, when crank pin 26 attains its second position shown on FIG. 5, and in which the "reverse-forward" mode is fully established, crank pin 26 tilts switch plate 79 of switch assembly 77 to separate switch plate 79 from fixed contact 78b and thereby open switch assembly 77 for halting the operation of control motor 32.

Once again, during the turning, of crank pin 26 with worm gear 24 from the position of FIGS. 1 and 2 to the position of FIG. 5 for selecting the "reverse-forward" mode, the resistance to such turning resulting from the force of spring 53 by which crank pin 17 is urged against capstan 15 is at least partially overcome or cancelled by the action of spring 27 on head base 20 which, through flange 29 acts to urge crank pin 26 to the position of FIG. 5. Thus, control motor 32 may be relatively small and the reduction ratio of worm 30 and worm gear 24 need not be too large so as to ensure relatively rapid change-over or establishing of the "reverse-forward" mode.

Figure 6:
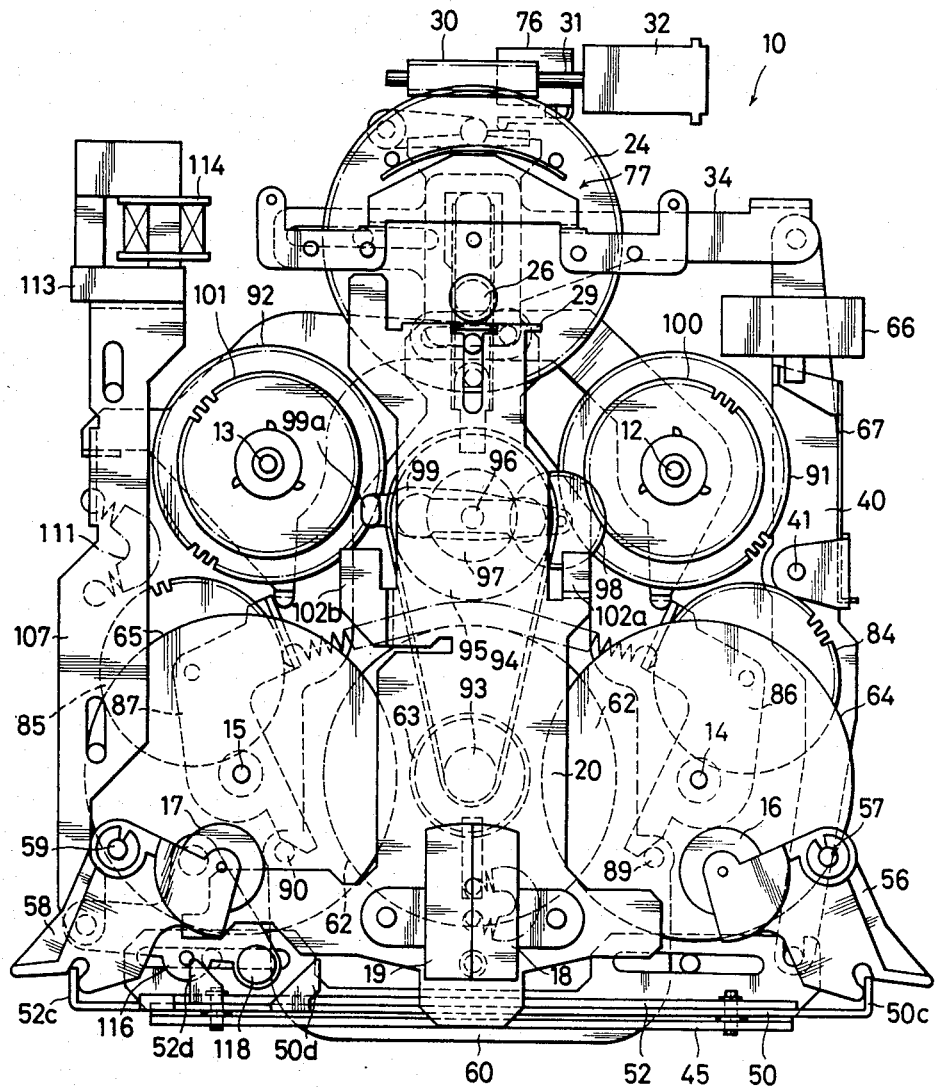
FIG. 6 is another plan view similar to that of FIG. 4, but showing the parts positioned for the selection of the "fast-forward" mode.

When it is desired to establish the "fast-forward" mode of operation, a push-button (not shown) for selecting that mode is manually depressed to suitably cause operation of motor 62 in the direction causing counterclockwise rotation of pulley 93 on its shaft while leaving control motor 32 inoperative. Thus, crank pin 26 and worm gear 24 remain in the first position thereof, as shown on FIG. 6, with the result that head base 20 is retained in its inoperative position and motor base 60 remains in its centered or neutral position. Further, due to the continued presence of crank pin 26 in its first position, link 34, lever 40 and slide member 45 all remain in the positions of FIGS. 1 and 2 which are characteristic of the "stop" mode, with the result that pinch rollers 16 and 17 remain in their inoperative positions spaced from capstans 14 and 15, respectively, drive wheel 63 is spaced from both fly wheels 64 and 65 so that capstans 14 and 15 are at rest, and pins 89 and 90 on motor base 60 continue to hold gear support levers 86 and 87 in their inoperative positions for spacing gears 84 and 85 from gears 91 and 92, respectively. Further, neither projection 50d nor projection 52d acts on pin 118 of operation controlling lever 116 so that the latter remains in the position shown on FIG. 6 to permit spring 111 to maintain slide member 107 with its armature 113 against electromagnet 114.

The counterclockwise rotation of pulley 93 by motor 62 is transmitted through belt 94 to pulley 95 to effect counterclockwise rotation of gear 97 which, in turn, causes clockwise rotation of gear 98 in mesh therewith. Due to the frictional engagement of gear 97 with lever 99, the latter is urged to turn in the counterclockwise direction about shaft 96. Since head base 20 is maintained in its inoperative position by crank pin 26, the projecting stop 102b on head base 20 is not engageable by abutment 99a on lever 99 to limit the turning of the latter and, therefore, gear 98 is moved into engagement with gear 100. Accordingly, take-up reel shaft 12 is rotated at relatively high speed in the counterclockwise direction by means of motor 62 through the transmission constituted by pulley 93, belt 94, pulley 95 and gears 97, 98 and 100. Such high speed rotation of reel shaft 12 in engagement with the take-up reel of an operatively positioned tape cassette is effective to cause fast-forward advancement of the tape from the supply reel to the take-up reel.

For establishing the "rewind" mode of the apparatus, a respective push-button (not shown) is manually depressed to suitably effect operation of motor 62 in the direction causing clockwise rotation of pulley 93. Apart from the foregoing, the conditions for establishing the "rewind" mode are the same as those described above for establishing the "fast-forward" mode. The clockwise rotation of pulley 93 causes clockwise rotation of gear 97 which, due to the frictional engagement of the latter with lever 99, causes clockwise turning of lever 99 until gear 98 engages gear 101 associated with reel shaft 13. Thus, in the case of the "rewind" mode (which is not illustrated), reel shaft 13 is rotated at high speed in the clockwise direction to effect the rapid rewinding of tape on the supply reel of an operatively positioned cassette.

Figure 7:
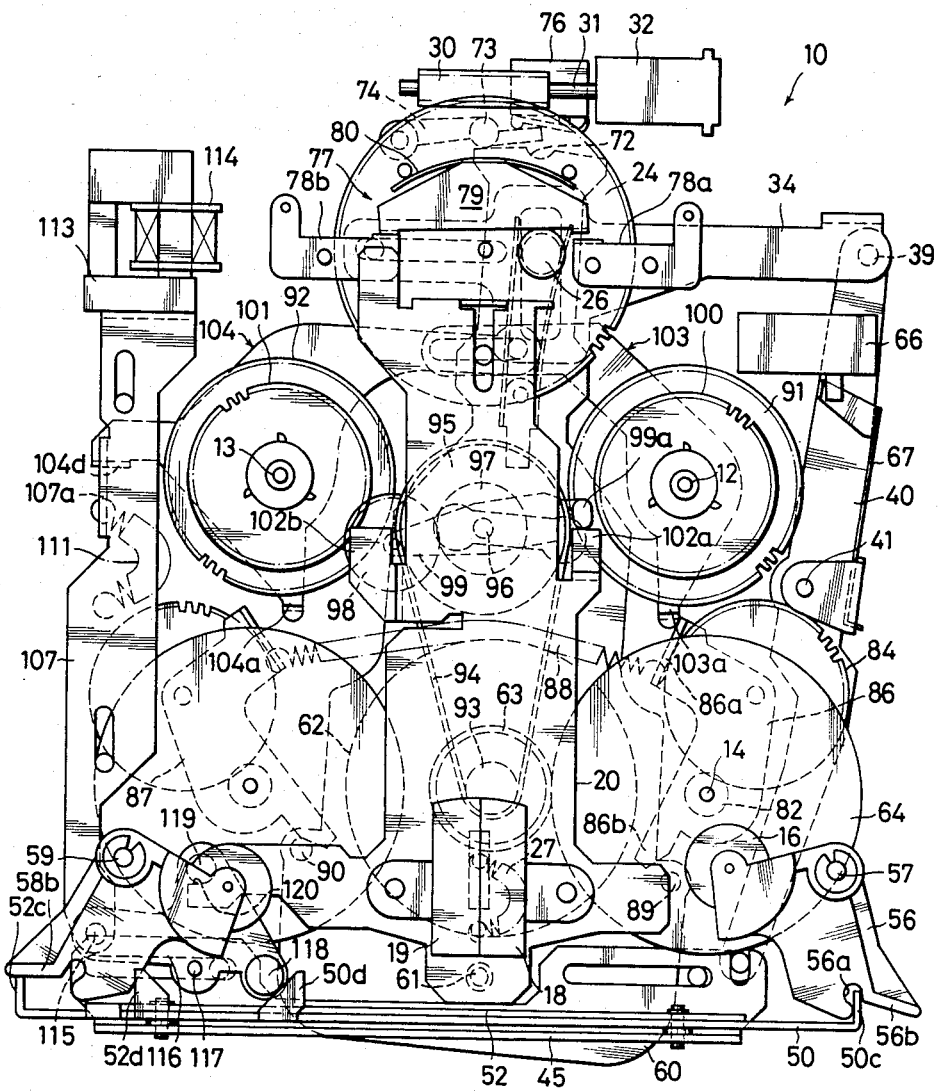
FIG. 7 is still another plan view similar to that of FIG. 4, but showing the parts thereof positioned for selecting a mode in which a silence interval is automatically detected.

Selection by mechanism 10 of the mode in which intervals of silence between recorded passages on the tape are automatically detected during the fast movement of the tape (hereinafter referred to as the "automatic detection of silence interval" mode) will now be described with reference to FIG. 7. The "automatic detection of silence interval" mode is established, for example, by depressing the push-button for establishing the "rewind" mode, or the push-button for establishing the "fast-forward" mode, at a time when the mechanism 10 is conditioned for the "normal-forward" mode as shown on FIG. 4. FIG. 7 specifically illustrates the case in which the "automatic detection of silence interval" mode is established by depressing the push-button for the "rewind" mode at a time when mechanism 10 is conditioned for the "normal-forward" mode. When the push-button for establishing the "rewind" mode is depressed with mechanism 10 conditioned for the "normal-forward" mode, electromagnet 114 is energized and control motor 32 is initially operated in the direction to return worm gear 24 and crank pin 26 to the first or "stop" position shown on FIG. 1 and 2 and, in response thereto, all of the other elements of mechanism 10 are restored to the positions characteristic of the "stop" mode as shown on FIGS. 1 and 2. Thus, slide member 107 is returned by spring 111 from the position of FIG. 4 to the position of FIG. 1 for disposing armature 113 against energized electromagnet 114. Immediately after the return of the elements to the positions characteristic of the "stop" mode, control motor 32 is operated in the opposite direction to turn worm gear 24 and crank pin 26 in the counterclockwise direction for restoration to the position shown on FIG. 7 and which is characteristic of the "normal-forward" mode. However, since electromagnet 114 is energized to attract armature 113 and thereby lock slide member 107 and operation controlling lever 116 in the positions shown on FIG. 7, blocking pin 119 on lever 116 remains in back of step 120 on head base 20 for limiting the rearward movement of head base 20 to an intermediate position, as shown on FIG. 7, as crank pin 26 is returned to the position characteristic of the "normal-forward" mode. Further, when link 34, lever 40 and slide member 45 are moved by crank pin 26 to the positions shown on FIG. 7, the locked condition of operation controlling lever 116 causes abutment pin 118 of the latter to block movement of projection 50d and pressing member 50 with slide member 45. In other words, during at least the final movement of slide member 45 toward the left to the position shown on FIG. 7, the engagement of abutment pin 118 with projection pin 50d prevents corresponding movement of pressing member 50 so that spring 53 is merely expanded or loaded and pinch roller support lever 56 remains in its illustrated inoperative position with the corresponding pinch roller 16 spaced from capstan 14.

When crank pin 26 is returned to the position shown on FIG. 7, the corresponding pivoting of motor base 60 about pivot pin 61 separates pin 89 from arm 86a of gear support lever 86. However, due to the energization of electromagnet 114 and the consequent locking of slide member 107 in the position shown on FIG. 7, locking levers 103 and 104 are retained in the positions in which their arms 103a and 104a are relatively far apart in the lateral direction with the result that arm 103a is engageable by the flanged end 86a of lever 86 to limit the pivoting of the latter by spring 88 and thereby maintain intermediate gear 84 out of engagement with gear 91. Thus, although the pivoting of motor base 60 in response to the return movement of crank pin 26 to the position shown on FIG. 7 causes drive wheel 63 rotated by motor 62 to engage fly wheel 64 and thereby rotate capstan 14, the driving of the tape by capstan 14 is prevented by the continued spacing of pinch roller 16 from capstan 14, and the driving of take-up reel shaft 12 from capstan 14 is avoided by the separation of intermediate gear 84 from gear 91 coupled with shaft 12. Instead, in the condition shown on FIG. 7, the clockwise rotation of the shaft of motor 62 is transmitted through pulley 93 and belt 94 to pulley 95 for similarly rotating gear 97 therewith. The clockwise rotation of gear 97 in frictional contact with lever 99 urges the latter to turn in the same direction. Since blocking pin 119 on the locked lever 116 is engaged by step 120 on head base 20 to limit the rearward movement of the latter to an intermediate position, the correspondingly positioned projecting stop 102a on head base 20 is engaged by abutment 99a on lever 99 only after the latter has turned sufficiently to engage gear 98 with gear 101 coupled with shaft 13. Thus, supply reel shaft 13 is rotated in the clockwise direction at high speed.

With the mechanism 10 in the condition shown on FIG. 7, heads 18 and 19 are, by reason of the intermediate position of head base 20, in slight slidable contact with the magnetic tape as the latter is driven at a high speed in the reverse direction so as to be rewound on the supply reel engaged with shaft 13. Such slight contact of heads 18 and 19 with the tape during the rewinding thereof makes it possible to detect a silence interval, that is, the interval between recorded passages on the magnetic tape. Upon detection of a silence interval, operation in the "automatic detection of silence intervals" mode can be terminated merely by interrupting the supplying of energizing power to electromagnet 114. As soon as electromagnet 114 is deenergized, slide member 107 and operation controlling lever 116 are free to be moved from the positions shown on FIG. 7 by the force of loaded spring 53 acting on pressing member 50 to complete the movement of the latter toward the left. As a result of such movement of member 50, the inclined edge of projection 50d, in engagement with abutment pin 118, causes pivoting of lever 116 and movement of slide member 107 to the positions shown on FIG. 4, and which are characteristic of the "normal-forward" mode. The pivoting of lever 116 to the position shown on FIG. 4 removes blocking pin 119 from engagement with step 120 so that head base 20 can be further moved rearwardly by spring 27 to its operative position in which heads 18 and 19 fully engage the tape and stop 102a on head base 20 acts on abutment 99a of lever 99 to space gear 98 from gear 101. Of course, the further movement of pressing member 50 toward the left under the urging of spring 53 causes movement of pinch roller support lever 56 to its operative position where pinch roller 16 presses against capstan 14 so that the latter drives the tape therebetween. The unlocking of slide member 107 in resonse to the deenergizing of electromagnet 114 and the consequent movement of slide member 107 to the position shown on FIG. 4 causes corresponding pivoting of locking levers 103 and 104 from the positions shown on FIG. 7 to the positions shown on FIG. 4 with the result that arm 103a of locking lever 103 no longer blocks the pivoting of gear support lever 86 by spring 88, whereby intermediate gear 84 engages gear 91 associated with reel shaft 12. Thus, take-up reel shaft 12 is rotated in the counter-clockwise direction at a speed characteristic of the "normal-foward" mode by being driven from motor 62 through drive wheel 63 and fly wheel 64 to capstan 14, and then through gears 82, 84 and 91.

It will be apparent from the above that, upon the deenergizing of electromagnet 114, the "normal-forward" mode is again established, and the playback or reproducing operation is resumed from the position to which the tape was rewound during the operation in the "automatic detection of silence interval" mode.

It will be seen that, in the above description of the establishment of the "automatic detection of silence interval" mode, electromagnet 114 is energized at a time when worm gear 24 and crank pin 26 are temporarily disposed in the first position thereof characteristic of the "stop" mode prior to being returned to the second position characteristic of the "normal-forward" mode. When crank pin 26 is temporarily disposed in the position thereof characteristic of the "stop" mode, spring 111 is effective to move slide member 107 rearwardly for engaging armature 113 against electromagnet 114. Therefore, the electromagnetic force generated by electromagnet 114 does not need to be large enough to attract armature 113 from a position spaced from electromagnet 114, but only has to be sufficient to retain or lock armature 113 against electromagnet 114 with the assistance of the force of spring 111. Thus, the current supply to the coil of electromagnet 114 does not need to be excessive whereby the mechanism 10 according to this invention is adapted for use in a battery powered apparatus.

In the above description of the establishment of the "automatic detection of silence interval" mode with reference to FIG. 7, the push-button for establishing the "rewind" mode has been depressed during operation of the apparatus in the "normal-forward" mode, whereby to rewind the tape to a desired position therealong and then to restart the playback in the "normal-forward" mode again. However, the "automatic detection of silence interval" mode may be established alternatively by depressing the push-button for the "fast-forward" mode during a playback operation in the "normal-forward" mode, in which case the tape is rapidly advanced to a desired position at which playback or reproducing is again started. Further, silence intervals can be detected during a playback or reproducing operation in the "reverse-forward" mode as well as in the "normal-forward" mode. In other words, during a playback or reproducing operation in the "reverse-forward" mode illustrated on FIG. 5, the push-button for the "rewind" mode or the push-button for the "fast-forward" mode may be depressed to either rapidly rewind the tape or fast-forward the tape to a desired position at which the playback or reproducing operation in the "reverse-forward" mode is again initiated. Since the establishment of the "automatic detection of silence interval" mode from the "reverse-forward" mode is similar to that described above starting from the "normal-forward" mode, the detailed description thereof is omitted herein. The mode for automatic detection of silence intervals may also be established starting with the mechanism 10 in the "stop" mode thereof shown on FIGS. 1 and 2. In such case, the push-buttons for the "normal-forward" mode and the "rewind" mode, respectively, or the push-buttons for the "normal-forward" mode and the "fast-forward" mode, respectively, are simultaneously depressed. In each such case, the initial return of crank pin 26 to the position characteristic of the "stop" mode and shown on FIGS. 1 and 2, as described above with reference to FIG. 7, is omitted as the crank pin 26 starts in such position and, therefore, it is only necessary to energize electromagnet 114 prior to turning worm gear 24 by motor 32 for disposing crank pin 26 in the position of FIG. 7. Thereafter, the establishment of the "automatic detection of silence interval" mode starting from the "stop" mode is the same as that described above starting from the "normal-forward" mode so that a detailed description thereof is omitted.

By way of summary, it will be noted that, in the described mode selecting mechanism 10 according to this invention, the balancing action of springs 27 and 53 in respect to the turning of worm gear 24 by control motor 32 makes it possible to reduce the capacity of the latter for minimizing the size and weight thereof and the power necessary for its operation in supplying the motive force for changingover from one to another of the selected modes. Further, the electromagnet 114 is arranged, as previously described, to require a minimum power supply, and the single motor 62 on the pivoted motor base 60 is effective to drive one or the other of the two capstans 14 and 15 and/or one or the other of reel shafts 12 and 13 in the "normal-forward" and "reverse-forward" modes and also in the "fast-forward" and "rewind" modes. Thus, the mode selecting mechanism 10 according to this invention is particularly suited for inclusion in a battery-powered, portable magnetic tape recording and/or reproducing apparatus.

Although an illustrative embodiment of the invention has been described in detail herein with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. A mode selecting mechanism for a magnetic tape recording and/or reproducing apparatus comprising:
   a chassis;
   rotary means mounted on said chassis for turning between a first position and second positions;
   a control motor operable for turning said rotary means and thereby changing the mode of the apparatus;
   a head base carrying magnetic head means and being slidably mounted on said chassis for movement between inoperative and operative positions;
   first spring means acting on said head base for urging the latter to one of said positions thereof;
   coupling means connected with said head base and being urged against said rotary means by said first spring means acting on said head base so that turning of said rotary means by said control motor is adapted to cause movement of said head base between said positions thereof;

capstan means rotatably mounted on said chassis;

pinch roller support means carrying pinch roller means and being mounted on said chassis for movements between inoperative and operative positions in respect to said capstan means; and connecting means engaging said rotary means and said pinch roller supporting means and including relatively movable connecting elements and second spring means interposed between said connecting elements and through which said pinch roller means is urged to said operative position against said capstan means with a predetermined pressure between said pinch roller means and said capstan means when said rotary means is turned by said control motor for disposing said head base in said operative position of the latter;

the forces of said first and second spring means, respectively, acting through said coupling means and said connecting means, respectively, on said rotary means for urging the latter in opposite rotary directions, respectively, during said turning of the rotary means by said control motor.

2. A mode selecting mechanism according to claim 1; in which said first spring means acts on said head base in the direction for urging said head base toward said operative position thereof, said coupling means applies the force of said first spring means to said rotary means so as to assist the turning of the latter for moving said head base to said operative position, and said connecting elements apply the force of said second spring means to said rotary means so as to yieldably resist said turning of the rotary means for moving the head base to said operative position at least after said pinch roller means is initially moved against said capstan means.

3. A mode selecting mechanism according to claim 1; in which said rotary means includes a crank pin movable along an arcuate path about a center of turning and being engageable by said coupling means and said connecting means.

4. A mode selecting mechanism according to claim 3; in which said movements of the head base between said inoperative and operative positions are influenced by a vector of the movement of said crank pin in said arcuate path which is parallel to a first direction through said center of turning, and said movements of the pinch roller support means between said inoperative and operative positions thereof are influenced by another vector of said movement of the crank pin in said arcuate path, which other vector is at right angles to said first direction.

5. A mode selecting mechanism according to claim 4; in which, in said first position of the rotary means, said crank pin lies on a line passing through said center of turning parallel to said first direction, said first position of the rotary means corresponds to said inoperative positions of said head base and said pinch roller support means, respectively, and said rotary means is turned approximately 90 degrees from said first position to one of said second positions for achieving said operative positions of the head base and the pinch roller support means, respectively.

6. A mode selecting mechanism according to claim 1; further comprising a capstan drive motor, a motor base carrying said capstan drive motor and being mounted on said chassis for movements between inoperative and operative positions, means for moving said motor base between said inoperative and operative positions in response to turning of said rotary means between said first and second positions thereof, and cooperative first transmission means on said capstan drive motor and on said capstan means and being engaged upon movement of said motor base to its operative position for driving said capstan means from said capstan drive motor.

7. A mode selecting mechanism according to claim 6; further comprising reel shaft means rotatably mounted on said chassis for supporting a tape reel, first gear means rotatably coupled with said reel shaft means for rotating the latter, drive gear means rotatable with said capstan means, intermediate gear means, first gear support means carrying said intermediate gear means in meshing engagement with said drive gear means and being movable between inoperative and operative positions in which said intermediate gear means is disengaged and engaged, respectively, with said first gear means, and means on said motor base for disposing said first gear support means in said inoperative and operative positions of the latter in response to said inoperative and operative positions, respectively, of said motor base.

8. A mode selecting mechanism according to claim 7; further comprising second transmission means operative, with said motor base and said head base in their respective inoperative positions, to effect high-speed rotation of said reel shaft means from said capstan drive motor.

9. A mode selecting mechanism according to claim 8; in which said second transmission means includes second gear means driven from said capstan drive motor, second gear support means carrying said second gear means and being mounted on said chassis for movement between an inoperative position in which said second gear means is spaced from said first gear means and an operative position in which said second gear means meshes with said first gear means for driving said reel shaft means in said high-speed rotation, said second gear means having frictional engagement with said second gear support means carrying the latter so that the driving of said second gear means by said capstan drive motor produces a reaction urging said second gear support means to said operative position thereof, and means on said head base blocking the movement of said second gear support means to said operative position thereof when said head base is in said operative position of the latter.

10. A mode selecting mechanism according to claim 9; further comprising electromagnetically operated means for permitting only partial movement of said head base toward said operative position thereof when said rotary means is turned to one of said second positions so that said means for blocking the movement of said second gear support means to its operative position is ineffective, and means responsive to said electromagnetically operated means to prevent movement of said pinch roller support means to said operative position thereof.

11. A mode selecting mechanism according to claim 1; further comprising switch means for controlling said control motor, said switch means being normally closed and being opened by said rotary means upon attaining one of said second positions of the latter for halting operation of said control motor.

12. A mode selecting mechanism according to claim 1; in which said capstan means includes forward and reverse drive capstans mounted on said chassis at opposite sides of said head base, said pinch roller support means includes pinch roller support levers pivoted on said chassis and carrying forward and reverse drive pinch rollers, respectively, for movement between inoperative and operative positions in respect to said forward and reverse drive capstans, respectively, said first position of said rotary means is a centered position and said control motor is reversible so as to selectively turn said rotary means in opposite directions from said first centered position to respective second positions for selecting forward and reverse modes, respectively, and said connecting means selectively urges said pinch roller support levers carrying said forward and reverse drive pinch rollers to said operative positions thereof in response to the turning of said rotary means to said second positions for selecting forward and reverse modes, respectively.

13. A mode selecting mechanism according to claim 12; in which said first spring means acts on said head base in the direction for urging said head base toward said operative position thereof, said coupling means applies the force of said first spring means to said rotary means so as to assist the turning of the latter from said first centered position toward either of said second positions for moving said head base to said operative position, and said connecting elements apply the force of said second spring means to said rotary means so as to yieldably resist said turning of the rotary means for moving the head base to said operative position at least after either of said forward and reverse pinch roller is initially moved against said forward or reverse drive capstan, respectively.

14. A mode selecting mechanism according to claim 12; in which said rotary means includes a crank pin movable along an arcuate path about a center of turning and being engageable by said coupling means and said connecting means.

15. A mode selecting mechanism according to claim 14; in which said movements of the head base between said inoperative and operative positions are influenced by a vector of the movement of said crank pin in said arcuate path which is parallel to a first direction through said center of turning, and said movements of the pinch roller support levers between said inoperative and operative positions thereof are influenced by another vector of said movement of the crank pin said arcuate path, which other vector is at right angles to said first direction.

16. A mode selecting mechanism according to claim 15; in which, in said first position of the rotary means, said crank pin lies on a line passing through said center of turning parallel to said first direction, said first position of the rotary means corresponds to said inoperative positions of said head base and said pinch roller support lever, respectively, and said rotary means is turned approximately 90 degrees from said first position to each of said second positions for achieving said operative positions of the head base and of the respective pinch roller support lever.

17. A mode selecting mechanism according to claim 12; further comprising a capstan drive motor, a motor base carrying said capstan drive motor and being mounted on said chassis between said forward and reverse drive capstans for movements between a centered inoperative position and forward and reverse operative positions deflected laterally in opposite directions from said centered inoperative position, means for moving said motor base from said inoperative position to a selected one of said operative positions in response to turning of said rotary means from said first to the respective one of second positions thereof, and cooperative first transmission means on said capstan drive motor and on each of said capstans and being engaged upon movement of said motor base to one of said operative positions for driving the respective capstan from said capstan drive motor.

18. A mode selecting mechanism according to claim 17; further comprising take-up and supply reel shafts rotatably mounted on said chassis at opposite sides of said head base for supporting respective tape reels, first gear means for each of said reel shafts and being rotatably coupled with the respective reel shaft for rotating the latter, drive gear means rotatable with each said capstan intermediate gear means for each of said reel shafts, first gear support means carrying each of said intermediate gear means in meshing engagement with the respective drive gear means and being movable between inoperative and operative positions in which said intermediate gear means is disengaged and engaged, respectively, with said first gear means associated with the respective one of said reel shafts, and means on said motor base for disposing each of said first gear support means in said inoperative position in response to said inoperative position of said motor base and selectively urging said first gear support means associated with said take-up and supply reel shafts to said operative positions thereof in response to movement of said motor base to said forward and reverse operative positions, respectively.

19. A mode selecting mechanism according to claim 18; in which said first gear support means are constituted by gear support levers pivoted about said forward and reverse drive capstans, respectively, a tension spring connects said gear support levers for urging the latter to said operative positions, and said motor base has blocking elements thereon which, in said inoperative position of said motor base, engage both of said gear support levers for retaining the latter in said inoperative positions against the force of said tension spring and which, in response to selective movement of said motor base to said forward or reverse operative position, selectively releases the gear support lever associated with said take-up or supply reel shaft, respectively, to permit movement of the released gear support lever to its operative position by said tension spring.

20. A mode selecting mechanism according to claim 18; further comprising second transmission means operative, with said motor base and said head base in their respective inoperative position, to selectively effect high-speed rotation of said reel shafts from said capstan drive motor.

21. A mode selecting mechanism according to claim 20; in which said second transmission means includes second gear means driven from said capstan drive motor, second gear support means carrying said second gear means and being pivotally mounted on said chassis for movement between an inoperative position, in which said second gear means is spaced from said first gear means associated with each of said take-up and supply reel shafts, and oppositely displaced fast-forward and rewind operative positions in which said second gear means selectively meshes with said first gear means associated with said take-up reel shaft and said supply reel shaft, respectively, for driving such associated reel shaft in said high-speed rotation.

22. A mode selecting mechanism according to claim 21; in which said capstan drive motor is reversible, said second gear means has frictional engagement with said second gear support means carrying the latter so that the driving of said second gear means by said capstan drive motor produces a reaction urging said second gear support means to said fast-forward or rewind operative position depending on the direction of operation of said capstan drive motor, and means on said head base blocking the movement of said second gear support means to either of said operative positions thereof when said head base is in said operative position of the latter.

23. A mode selecting mechanism according to claim 22; further comprising electromagnetically operated means for permitting only partial movement of said head base toward said operative position thereof when said rotary means is turned to either of said second positions so that said means for blocking the movement of said second gear support means to its operative position is then ineffective, and means responsive to said electromagnetically operated means to prevent movement of either of said pinch roller support levers to said operative position thereof.

24. A mode selecting mechanism according to claim 23; in which said connecting element include a slide member mounted for lateral sliding on said chassis, a mechanical linkage connecting said rotary means with said slide member for laterally displacing said slide member in opposite directions from a neutral position in response to said second positions of the rotary means for selecting said forward and reverse modes, forward and reverse pressing members mounted on said slide member and yieldably urged to move laterally with the slide member by said second spring means, and cooperatively engageable means on said forward and reverse pressing members and said support levers carrying said forward and reverse pinch rollers, respectively; and in which said means to prevent movement of either of said pinch roller support levers to said operative position includes projections extending from said pressing members, and an abutment moved into paths of movement of said projections with said pressing members in response to energizing of said electromagnetically operated means for blocking movements of said pressing members with said slide member.

25. A mode selecting mechanism according to claim 12; further comprising switch means for controlling said control motor, said switch means being normally closed and being opened by said rotary means upon attaining either of said second positions of the latter for halting operation of said control motor.

* * * * *